United States Patent [19]

Gaukel et al.

[11] Patent Number: 5,200,995
[45] Date of Patent: Apr. 6, 1993

[54] UNIVERSAL OUTGOING CALL RESTRICTION CIRCUIT

[76] Inventors: John J. Gaukel, 4118 N. 105th St., Omaha, Nebr. 68134; Gerald C. Korth, 16565 Nina Cir., Omaha, Nebr. 68130; Luis N. Fortun, 5005 N. 93rd Ave., Omaha, Nebr. 68134

[21] Appl. No.: 632,980

[22] Filed: Dec. 24, 1990

[51] Int. Cl.[5] .............................................. H04M 1/66
[52] U.S. Cl. ....................................... 379/200; 379/188
[58] Field of Search ................... 379/95, 184, 188–191, 379/194–196, 199, 200

[56] References Cited

U.S. PATENT DOCUMENTS

| | | | |
|---|---|---|---|
| 3,920,936 | 11/1975 | Mogtader | 379/190 |
| 4,188,508 | 2/1990 | Rogers et al. | 379/200 |
| 4,336,422 | 6/1982 | Mellon | 379/189 |
| 4,346,264 | 8/1982 | Sharvit | |
| 4,358,640 | 11/1982 | Murray | |
| 4,453,040 | 6/1984 | Wolf et al. | |
| 4,482,787 | 11/1984 | Sagara et al. | 379/200 |
| 4,511,765 | 4/1985 | Kuo | 379/190 |
| 4,612,419 | 9/1986 | Smith | |
| 4,683,583 | 7/1987 | Kossor | 379/200 |
| 4,794,642 | 12/1988 | Arbabzadah et al. | 379/200 |
| 4,866,762 | 9/1989 | Pintar | 379/188 |
| 4,926,470 | 5/1990 | Sanford | 379/188 |
| 4,965,459 | 10/1990 | Murray | 379/200 |
| 4,993,062 | 2/1991 | Dula et al. | 379/189 |
| 5,018,190 | 5/1991 | Walker et al. | 379/95 |

FOREIGN PATENT DOCUMENTS

| | | | |
|---|---|---|---|
| 1132276 | 9/1982 | Canada | 379/200 |
| 2086187 | 5/1982 | United Kingdom | 379/200 |
| 8500716 | 2/1985 | World Int. Prop. O. | 379/200 |

Primary Examiner—James L. Dwyer
Assistant Examiner—Wing F. Chan
Attorney, Agent, or Firm—Zarley, McKee, Thomte, Voorhee & Sease

[57] ABSTRACT

A circuit which prevents a telephone or a plurality of telephones from making unauthorized or restricted calls to specific numbers or unspecific groups of numbers. The restricted call numbers may be local or toll call. The circuit is disabled either on a call by call basis, or indefinitely by entering a user defined pass code. The circuit is programmable from any commercially available touch-tone phone. When in the call restriction mode, the circuit detects outgoing calls by detecting and decoding standard 'DTMF' burst. Upon detecting the first valid tone, the circuit isolates the user from the central office equipment. The circuit then parses the first and all following DTMF bursts and compares them against preprogrammed internal lists of fixed or relative restricted numbers. If a fixed number or a relative group of numbers is validly compared to the internal lists, the circuit continues to lock out the user until the central office will no longer accept a number, at which time, the circuit releases the line and restores the user to central office access. If no valid comparison is made to the internal lists, the circuit dials the remaining numbers in a burst mode, and restores user access to the central office as the call is completed. Use of the '*' key and '' keys allow special programming options, and user disabling via special pass codes. The system may optionally be used with rotary dial phones and can be used with non-telephone voice and/or data communication systems.

38 Claims, 6 Drawing Sheets

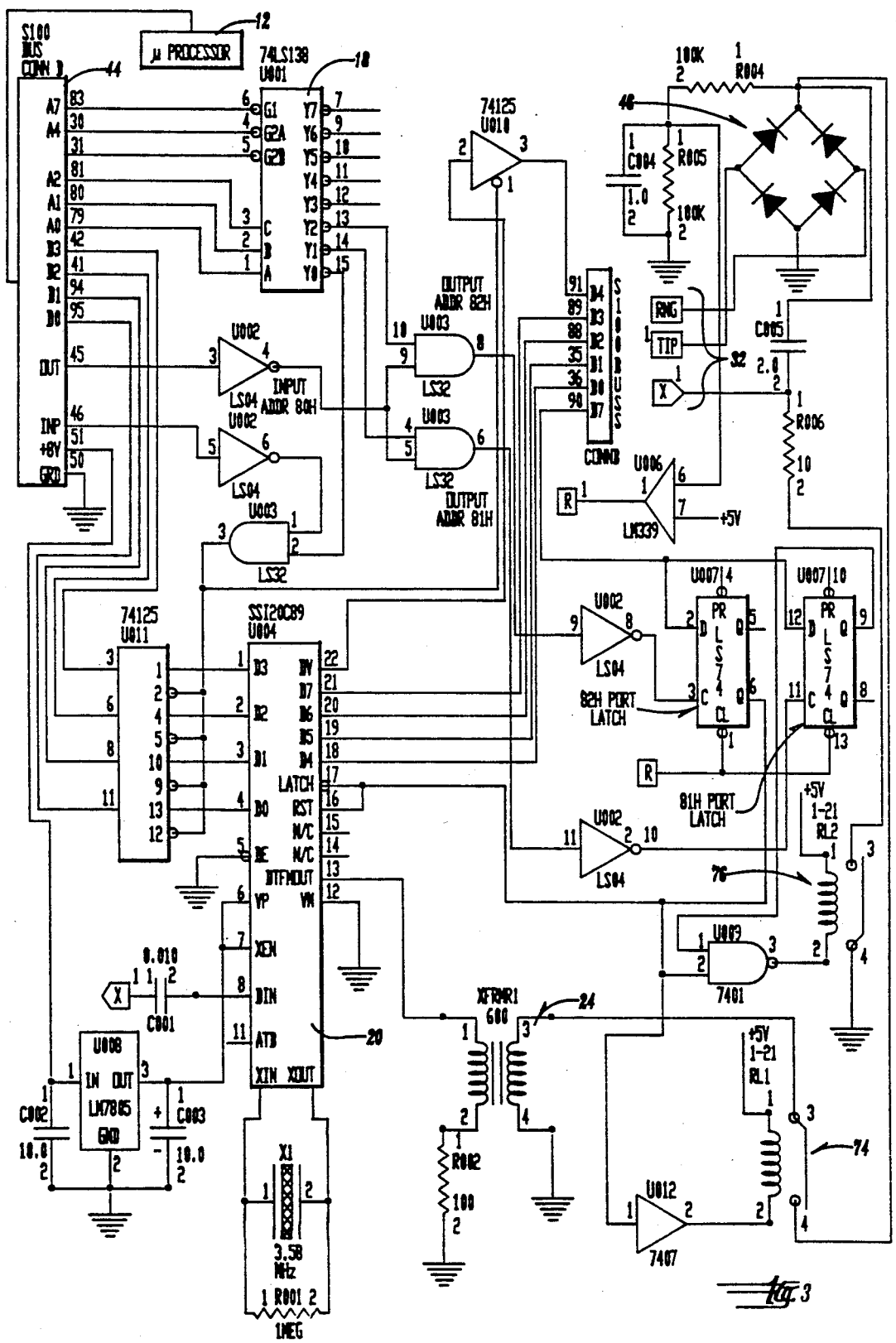

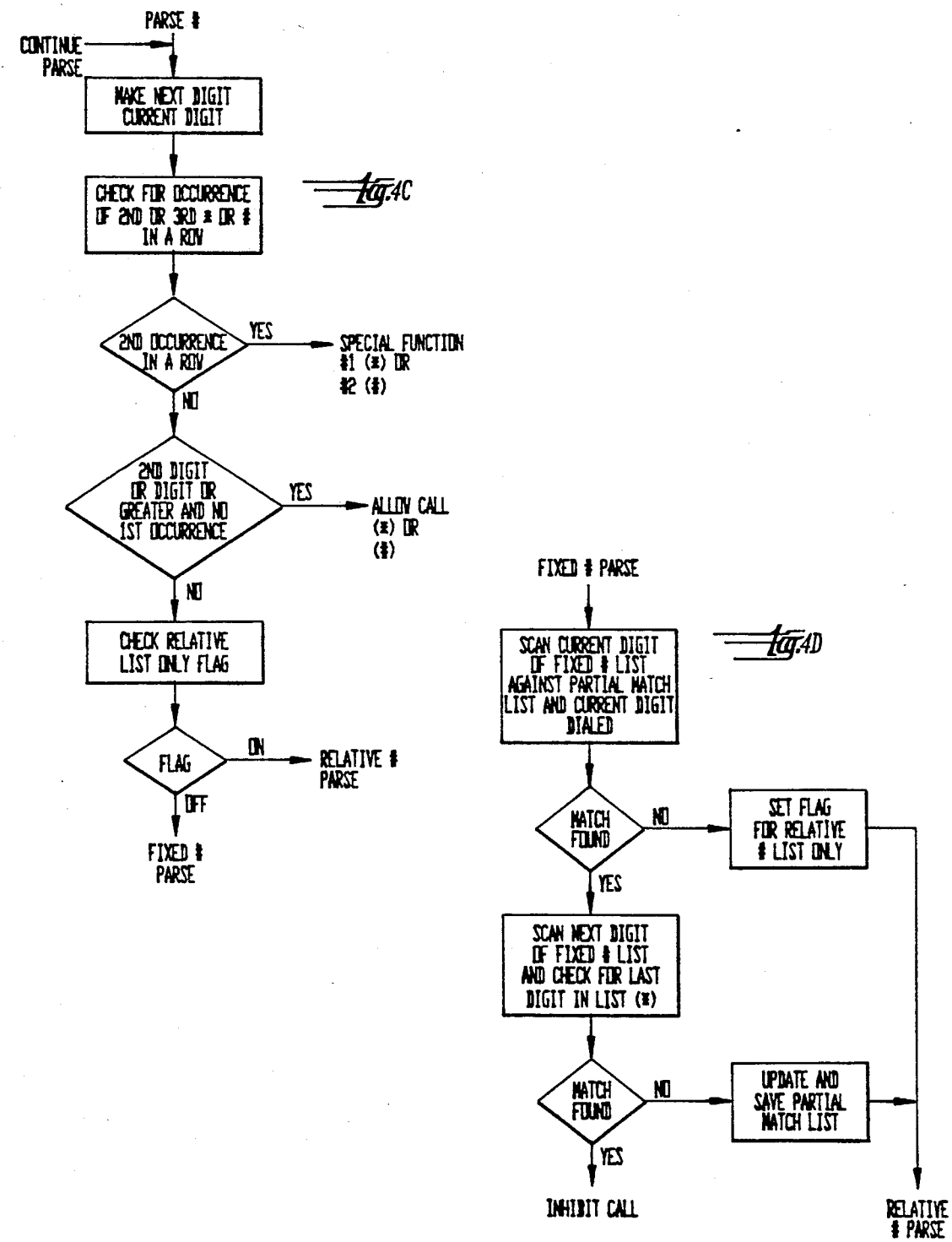

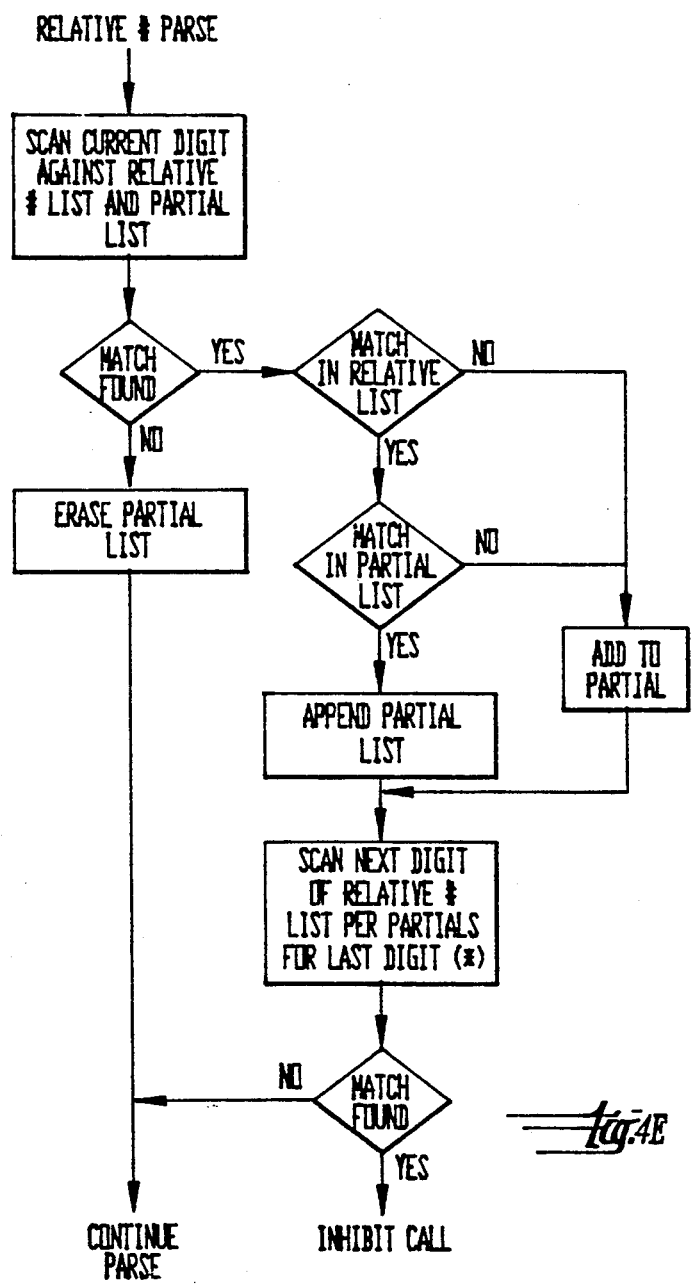

UNIVERSAL OUTGOING CALL RESTRICTION CIRCUIT

FIELD OF THE INVENTION

The present invention relates to electronic telephone stations, and more specifically, to the inhibiting of unauthorized calls of any nature from a telephone station or a plurality of telephone stations. "Unauthorized calls" are described herein as any call placed on a subscriber's standard telephone station or stations to any telephone number or access number which the responsible owner of the subscriber's service does not wish unauthorized persons to originate on the owner's subscribed line or telephone station or communications link. "Universal" as described herein means that the inhibiting of numbers is not limited in any manner, and that any dialable number, or any part of any dialable number, or any partial template of a number may be used to screen or determine if a particular call should be inhibited. "Universal" as described herein also means that the circuit or its hardware/computer code analogy may be integrated into the subscriber system at any accessible location, or even integrated into a central office or standard telephone. The invention can also be used in almost any application where communication of data or voice is accomplished by transmission initiated through a dialing procedure, whether tone or pulse, push button or rotary dial. Still further, the invention is "universal" in that it can also serve to allow only those numbers or partial numbers on an internal list to be dialed and connected.

BACKGROUND OF THE INVENTION

There are several patents which address inhibiting unauthorized calls from standard telephone stations.

One of these, Smith, U.S. Pat. No. 4,612,419, entitled "Toll Restriction Circuit for an Electronic Telephone Station", describes a means controlling toll calls only, and is employed within the telephone station itself. It looks for a "0" and "1" in the first dialed digit. The subscriber can lock and unlock the device via keypad entry of an enabling or disabling code.

Another device is disclosed in Murray, U.S. Pat. No. 4,358,640, entitled "Telephone Security Device," and describes a circuit which claims to have means to allow or disallow toll calls on entry of a programmable code stored in an EAROM (electrical alterable read-only memory). This device is claimed as an integral part of a telephone station or connected to the same. The device claims use of a three digit authorization code to set a mode register means which is detected and acted on by the circuitry. The mode register means restricts the telephone station in question to either of three states; namely normal, local, or restricted. The invention claims use with pulsed dial operation only.

Yet another patent is described is Kossor, U.S. Pat. No. 4,683,583, entitled "Method and Apparatus for Controlling Telephone Line Access." This invention describes a means of preventing unauthorized calls from being placed from conventional or cordless type receivers. As in the previously described patents, this patent depends on use of code sequences to enable or disable uses of a particular telephone device. This invention describes limiting all calls or allowing all calls via the described code, or via a mechanical key device.

Still another approach is claimed in Sharvit, U.S. Pat. No. 4,346,264, entitled "Telephone Call Restriction Apparatus." In this invention, Sharvit refers to means to inhibit pulse dial type calls from being routed through a PABX (Private Access Branch Exchange) in two different modes. In one mode, unless an access code is received as the first three digits, the remainder of the number is prohibited. In the second mode, a means is provided to inhibit all numbers beginning with certain numbers such as '1' and '0', or specific three digit codes for local exchanges which one may wish to prohibit. Sharvits also teaches a means of putting this in a standard telephone circuit or PABX. The intent of this invention is to allow control of PABX services to specific exchanges or groups of exchanges, and to limit toll calls to specific authorized individuals, when used in conventional pulse dial applications.

Sharvit also teaches a means of loading the line so as to inhibit outgoing dial pulses to a central office, yet still allowing his described circuit to detect and count dial pulses and operate his circuit as he describes.

In another patent of the same title, Sharvit U.S. Pat. No. 4,314,108, shows the above means of restricting calls, but necessitates clearing the line to the central office, and obtaining another dial tone before allowing an authorized call to go through.

In all the above-discussed prior art, means to detect, decode, and react to specific numbers is shown. In addition, the art shown describes many ways to restrict calls by interrupting the call process. The prior art show a means of either setting an apparatus to screen or partially screen toll calls, or require an access code preceding the desired dialed number. In all cases, all of the devices allow non-prohibited originating telephone dial signs to be directly passed through to the central office without modification after a logical means has determined if a call is prohibited or not.

An inherent difficulty and deficiency of the prior art is that all these restriction means must use the first digit or first few digits to provide access or inhibit a dialed number. It is neither obvious from any of the prior art how to restrict a call based on a number of numbers contained at any location within a sequence of numbers without interpreting it as a nonprohibited call, nor is it discussed as a possibility, nor until very recently, has the need to do so existed. The prior art does not disclose a means of intercepting, diverting, and retaining an entire number or any part or parts of a number until logical means detects and allows an authorized call to go through, or a repeating means completes the call by dialing any or all of the retained digits. None of the existing art show or hint at a means of allowing part of a number to be dialed to the central office and then restricting the rest of the number unless the number(s) is/are the first one(s) dialed. Such art as shown does not teach us how to construct a machine which can retain a dialed number and parse it against any number of prohibited combinations of numbers or parts of numbers, and redial it if required.

The prior art also does not show a system which can be used to provide a limited list of numbers or partial numbers which can be successfully dialed out.

It is the object of this invention to overcome these limitations, and provide a universal means of prohibiting unauthorized numbers from being dialed or generated from any phone PABX, central office, computer, or communications means, which would allow an unauthorized connection or information passage between two devices which use DTMF (Dual Tone Multifrequency), dial pulses, or other sequential number transmission means to establish communications, either verbal or non-verbal.

Since the above patents were granted, a demand has developed to control telephone devices in a more universal manner. Such developments are typified, for example, by the so-called in-bound telemarketing groups. Such groups advertise on national media and have the undesirable side effect of enticing minors and irresponsible individuals to call their numbers. Groups are then paid via telephone company billing for minute total toll charges.

As of this filing, some telephone companies are offering screening of select area groups such as 1-976-xxx-xxxx or 1-900-xxx-xxxx numbers, but they are charging in some instances, and the selection is fixed. No options are available for screening other than this type call, with the exception of screening all long distance toll calls. The telemarketing groups by their nature will devise more and varied numbers to confound any effort by any simple scheme such as the telephone company has currently employed.

Additionally, there are simply many cases where it would be desirable to be able to reliably and efficiently restrict any desired telephone number, or class or telephone number. Analogously, there are situations where it is desirable to ensure that only certain numbers or numbers with certain partial sequences, are allowed to be successfully completed. There are various desirable reasons for such a system, but, at present, this need has not been recognized and no satisfactory system has been created to meet this need.

The invention herein described overcomes inherent limitations of the other patents described and existing prior art in dealing with the above problems by providing a universally usable means for screening all outgoing calls of an unwanted or restricted nature, regardless of the nature or length of the number, or regardless of whether the call is a local or long distance toll charge. By being universally programmable, the herein described invention improves over or solves the deficiencies and problems in the art, and provides novel and unique advantages over the prior art.

Additionally, the present invention can be added to any single phone jack without effecting any other extensions on that line.

SUMMARY OF THE INVENTION

In accordance with the present invention, a universal call restriction circuit is provided for use in conjunction with a standard telephone line as a means of inhibiting unauthorized or restricted calls (or allowing only authorized calls) on any given standard telephone voice line. The invention can also be utilized with respect to non-voice communications including but not limited to, modem use of data or non-voice communications over telephone lines, fascimile or telecopy transmissions, and the like.

The invention operates by capturing and decoding any attempted dial-out on the telephone line. The tone or pulse dialing signals are decoded by converting them into the recognized code characters for the respective tones and pulses. The code characters usually consist of the conventional telephone key decimal digits and symbols of "0,1,2,3,4,5,6,7,8,9,10, TM".

A pre-created list of restricted number sequences is checked against the dialed sequence of characters. If any part of the dialed sequence of characters matches an entry on the restricted list, the dialed signal will not be allowed to pass and be sent to its intended destination. If, however, the dialed signals do not match any item on the restricted list, the dialed signal is allowed to be sent to its intended destination. It can also be devised to allow passage of a part of the dialed sequence until a match on the restricted list is detected.

The invention is universal because it allows the restricted list to contain more than simply entire conventional telephone numbers (e.g., 1-976-555-5555; 455-1777; 1-455-1777; etc.). It also is not limited to simply testing whether the first dialed character is an attempt to use the phone for a long distance or operator call (e.g., "0" or "1"). Still further, it is not limited to restricting only a few undesired area codes such as "800" or "900" numbers, or a few specific prefixes.

Instead, the invention allows any full or partial combination of character sequences to be restricted. It still allows restriction of all long distance or operator calls, or specific complete toll numbers or local calls, if desired. Additionally, it allows restriction of dialed sequences containing anywhere from one to an unlimited number of specific characters, or of dialed sequences containing in part designated character combinations. The invention even allows restriction of combinations of certain characters in certain order with variables in between.

Moreover, as previously mentioned, instead of screening outgoing calls by restricting those dialed numbers or partial numbers on a restricted list, the invention can screen outgoing calls by allowing only dialed numbers or partial numbers on an allowed list to successfully be connected.

Thus, for whatever purpose, the invention can be adapted to any number of uses, and is much more flexible than prior systems. It also allows for reprogramming to change the entries on the restricted or allowed list; to include access or override codes, to automatically turn the system on or off at various times and dates, and to facilitate other functions as may be needed. The means to accomplish the invention include a decoder for decoding the dialing signals, a control unit for comparing the decoded dialing signals with the restricted or allowed list and to operate disabling means to block the dialing signal from going to its intended destination upon finding a match of any part of the dialing signal with the restricted list (or not finding a match if using the allowed list). The means furthermore can include a regenerator for repeating the dialed signal once determined that it should not be restricted. Various other components are included in the circuitry to facilitate providing power to the circuit, and conditioning and regulating that power as needed to operate the circuit.

It can therefore be seen that the invention achieves at least all of its stated objective.

BRIEF DESCRIPTION OF THE DRAWINGS

FIG. 1A is a simplified diagrammatical view of one way the invention can be incorporated in series with an existing phone system.

FIG. 3 is a detailed electrical schematic of the embodiment of FIG. 2.

FIG. 4A-E is a flowchart of one embodiment of logic which can be used by the invention.

DETAILED DESCRIPTION OF THE PREFERRED EMBODIMENTS OF THE INVENTION

Figure 1:
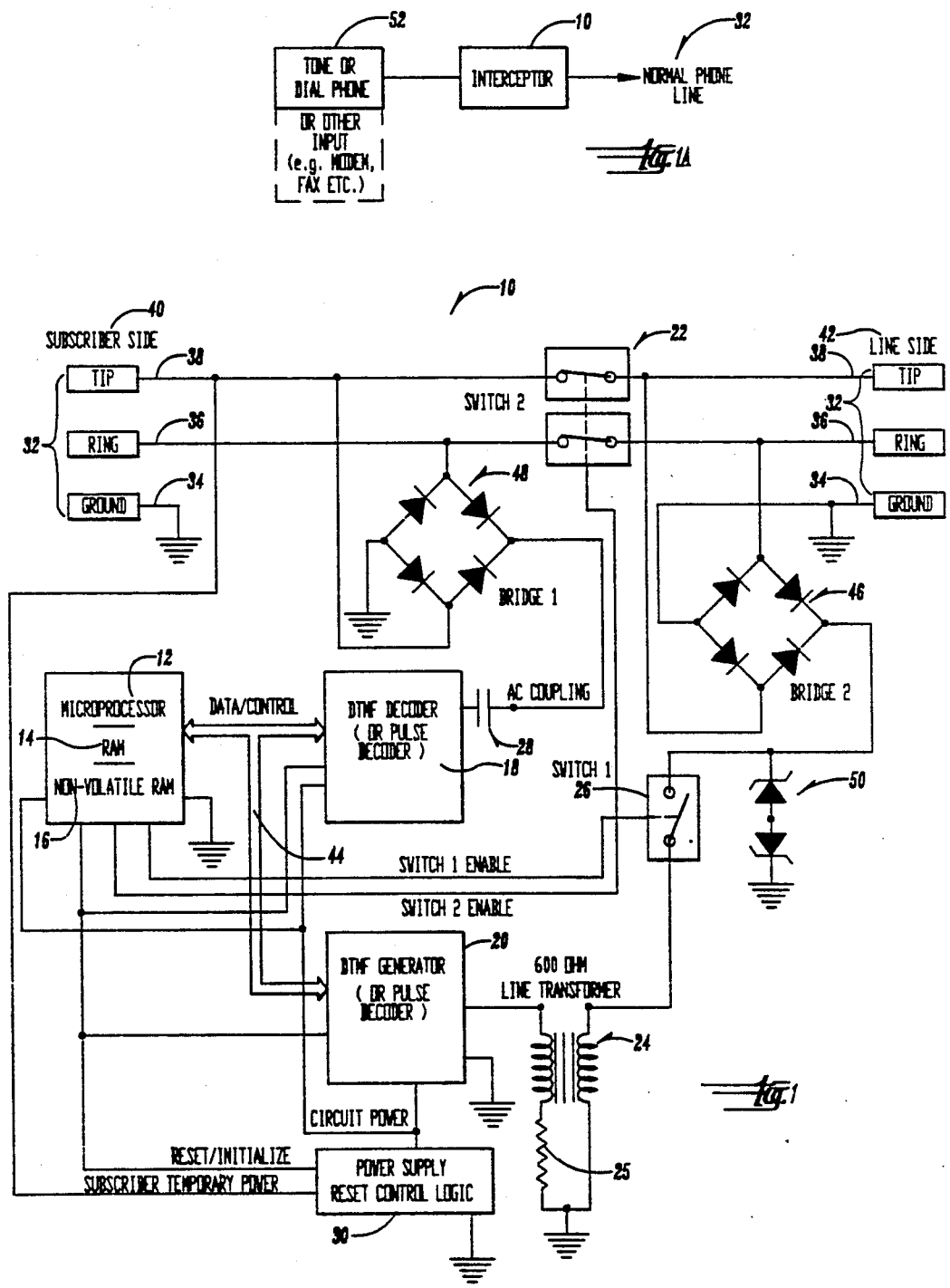
FIG. 1 is a diagrammatical view of one embodiment of a circuit according to the invention connected in series with a conventional telephone line.

In order to gain a better understanding of the invention, preferred embodiments of the invention will now be described in detail. It is to be understood that the invention can take many shapes and forms, and that the following descriptions do not limit the scope of the invention. The descriptions will include references to the drawings. Like reference numerals will be used for like parts throughout the drawings, unless otherwise indicated.

This description will first discuss the invention generally with respect to two specific embodiments. Some alternative or optional features of the embodiments will also be discussed. Thereafter, specifics of one embodiment will be discussed followed by further discussion of operational and functional considerations with respect to the embodiments.

With particular reference to FIG. 1, an embodiment of the invention which can be installed in series fashion into a telephone line between the subscriber side and line side of the telephone line is shown diagrammatically.

The call restriction circuit 10 of FIG. 1 includes a microprocessor 12 (shown diagrammatically only, as connected to a data/control bus 44 such as is known in the art), a memory 14 connected to microprocessor 12, a dual tone multi-frequency 'DTMF' decoder 18 connected to microprocessor 12, a DTMF generator 20 connected to microprocessor 12, a switch means 22 connected to microprocessor 12, a line transformer 24 connected to DTMF generator 20, a switch 26, a line decoupling capacitor 28 connected to DTMF decoder 18, and a power supply/reset control logic 30 connected to microprocessor 12 and other powered logic. The invention connects to a conventional phone line 32 via a standard modular connector (not shown).

Conventional phone line 32, such as is known in the art, consists of a ground line 34, a "ring" line 36, and a "tip" line 38. Also, as depicted in FIG. 1, subscriber side 40 refers to the user's phone (or multiple phones) whereas the line side 42 relates to where the telephone line ultimately connects into the phone system for access to the phone network.

In the description of the preferred embodiments, unless otherwise noted, phone line 32 carries DTMF dialing signals which represent coded characters relating to each key of a standard phone (e.g., "0,1,2,3,4,5,6,7,8,9,10, TM"). It is to be understood that coded characters could be contained in pulse dialing signals. Decoding components and generation components for both DTMF and pulse signals are well-known within the art.

The microprocessor 12 operates in response to the first tones generated from subscriber side 40 subsequent to an off-hook (for example, when the receiver is taken off its "hook") condition. The microprocessor 12, upon decoding the first decimal digit of a normally dialed number, isolates the user from the central office (line side) while retaining termination to the of the central office, and retains power to the subscribed side to enable continued tone generation by the subscriber. The first number is compared to an internal set of lists.

In this embodiment, the microprocessor 12 retains a minimum of at least five lists in RAM (Random Access Memory) memory 14, namely; (a) a list of complete fixed numbers of specific content and length, (b) a list of fixed phone number groupings each with a specific beginning number and of specific length, (c) a list of partial number sequences which are detected anywhere within a phone number, (d) a list of feature or option selection codes, and (e) a list of programming authorization codes. The fixed number list, the group list, and the partial list (hereafter referred to as the 'number lists') may contain number sequences which consist of arbitrary or 'wildcard' numbers (or "variables") mixed with decimal numbers.

If a match is found in any list, microprocessor 12 keeps track of whether a full match or a partial match is found, and retains the number in memory 14 in sequence as received from the subscriber. If a full match is found on the first digit (that is, where a match is made for a one-number listing on any number list), microprocessor 12 holds the line termination until the central office (line side) "times out" (that is, discontinues connection after a preset period), then restores subscriber access and normal function of the unit. The subscriber must hang up the phone in the normal manner and provide the central office with on-hook status to obtain another dial tone from the central office, similar to normal telephone operation.

If no full match is found to any of the numbers in the number lists, microprocessor 12 continues to process subscriber entered tones in a similar manner as the first tone, while still holding the subscriber isolated from the central office. In a similar manner to the first digit, if a match is found in any successive digit, microprocessor 12 keeps track of whether a full match is found, or a partial match, and retains the number in memory 14 in sequence as received from the subscriber. If a full match is found on any remaining digit, microprocessor 12 holds the line termination until the central office times out, then restores subscriber access and normal function of the unit. The subscriber must hang up the phone in a normal way and provide the central office with on-hook status to enable obtainment of another dial tone from the central office, similar to normal telephone operation.

While circuit 10 is enabled, and is analyzing or parsing subscriber input tones, circuit 10, in its preferred embodiment, is constantly looking for a special non-decimal code to establish that the desired number is completely entered by the subscriber. Commonly available telephone sets have available both a "*" key and a ' TM ' key which are sometimes used to enable or disable special central office functions.

In this embodiment, a ' TM ' key tone, when encountered as other than a first digit, is recognized and signifies to the circuit that the entire number has been entered.

If the circuit determines the number is completely entered, and no full match has been found, microprocessor 12 removes isolation from the subscriber, connects the subscriber to the central office and then rapidly completes sending the remaining digits the central office is still anticipating.

Circuit 10 employs a power supply means 30 which contains commonly available components and logic to use available line voltage, regulate the voltage to levels needed by the other circuit components, and generate a reset pulse on an on-hook to off-hook condition. Power supply 30 also contains sufficient means to supply the subscriber telephone adequate voltage to maintain its tone generator functional while it is in temporary isolation form the central office. It is to be understood that the nature of supply 30, as with most regulating power supplies, is to isolate any effect of the output from interfering with the supply input, hence any tones generated are filtered from the line to the central office while the subscriber is isolated.

The subscriber is isolated form the central office by a switch means 22. In this embodiment, reed relays (such as are well-known within the art) are used, however, solid state devices could be used equally as well, and would lend the entire circuit to integration into a single integrated circuit, with a minimum of discrete components.

A temporary load means is connected by microprocessor 12 to circuit 10 when the subscriber is isolated. In this embodiment, the load is a standard 600 ohm telephone line isolation transformer 24 (including termination resistor 25, which is recommended by the manufacturer of DTMF generator chip 20 to limit current to that chip). The same load means is employed as a transducer to create repeated tones generated by DMTF generator 20 as required when the circuit completes the call to the central office upon detection and allowing of a non-restricted call.

The circuit as shown in the series embodiment of FIG. 1 may be installed in several different manners. FIG. 1A shows in simplified diagrammatical form the relative position of the invention in the phone line; whether associated directly with phone 52 or spliced or connected into phone line 32 at some location. FIG. 1A also indicates automated devices such as modems can also be operated with the invention.

One method is to place circuit 10 in a tamper resistant package (not shown) which can be mounted to a standard modular plug, while providing a standard modular jack for the subscriber to plug into any plurality of standard telephone stations. The package could incorporate a visual indication if the package was mechanically tampered with.

Another method is to place circuit 10 inside and integral to a standard phone station. When so mounted, the serial embodiment must be used on all standard phone stations associated with any single or multiplicity of lines to the central office.

Another method is to place circuit 10 at the terminus between the central office and the subscriber.

Another method is to place circuit 10 at a central switching point for multiple line offices. When so mounted, one circuit must be available for as many lines as may be enabled at any given time.

Yet another method of installing circuit 10 would be to incorporate it into a standard PBX device.

Another method is to place circuit 10 or its hardware/software analogue in a central office electronic switching system as is typically used by telephone service providers.

Another method is to place circuit 10 in cellular communications links or any other communication system which uses DTMF means to establish station-to-station path linkages.

Again, the above embodiment could also be applied to dial pulse techniques, however as that technology is old and rapidly dwindling in use, the tone dialing approach is shown in the preferred embodiment. Prior art exists to count pulses, and code the result into a computer-detectable result which could then be screened in the same manner as described in the preferred embodiments. Prior art also exists to decode key depressions from a telephone keypad or to decode rotary dialed numbers by monitoring dial rotation.

As can be seen, microprocessor 12, ram 14, and nonvolatile ram 16 can be incorporated into one unit or chip, as desired. Digital signals would be communicated between microprocessor 12 and its memories, and decoder 18 and generator 20 by data/control bus 44. Microprocessor 12 would issue analog instructions to switch 26 and switch 22 by conventional electrical cable. The power as from power apply 30 additionally would be supplied to the various components by conventional electrical cable.

In the embodiment of FIG. 1, it is shown how switch 22 would be a tandem switch spliced into ring and tip lines 36 and 38 of phone line 32 to disconnect those lines upon appropriate signal from microprocessor 12. Bridges 46 and 48 are utilized in the circuitry as shown.

Capacitor 28 is utilized for alternating current (AC) coupling. A Zenor diode combination as known in the art is also utilized to protect against voltage surges when switch 26 is open.

Figure 2:
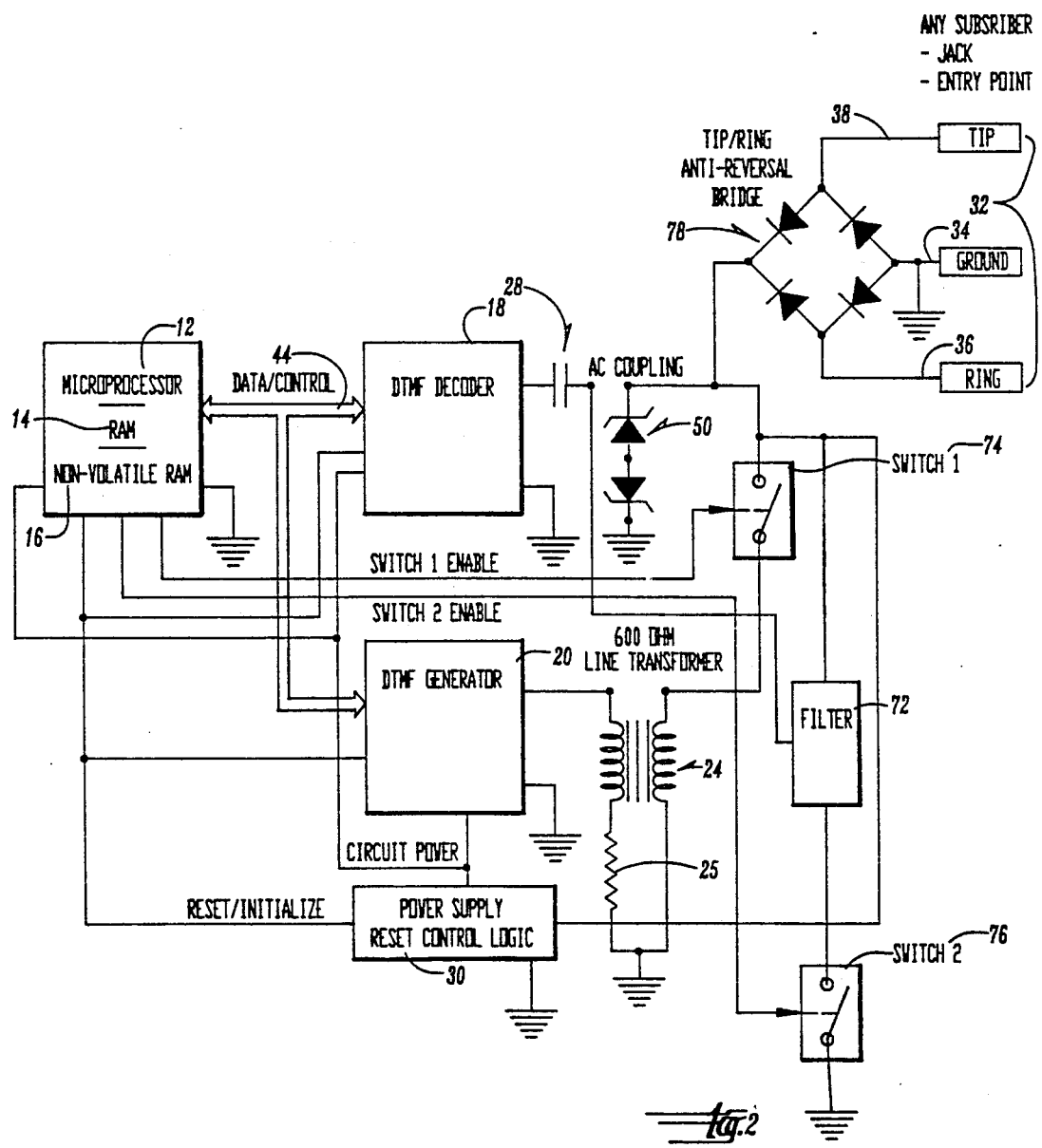
FIG. 2 is a diagrammatical view of another embodiment of the invention connected in parallel to a conventional telephone line.
Figure 4A:
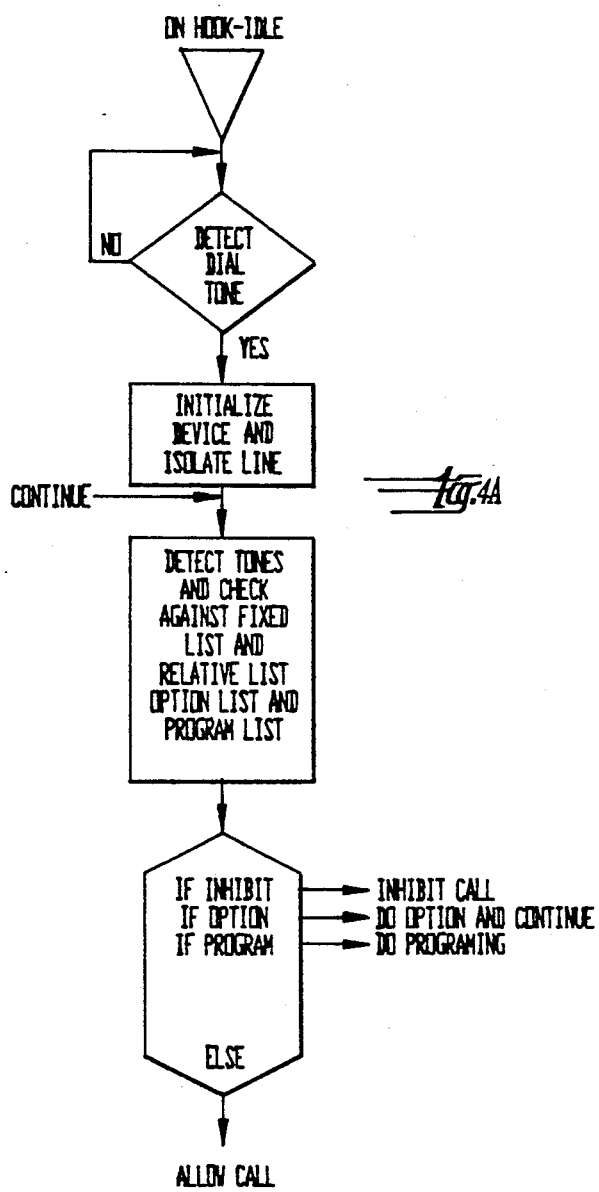
Figure 4B:
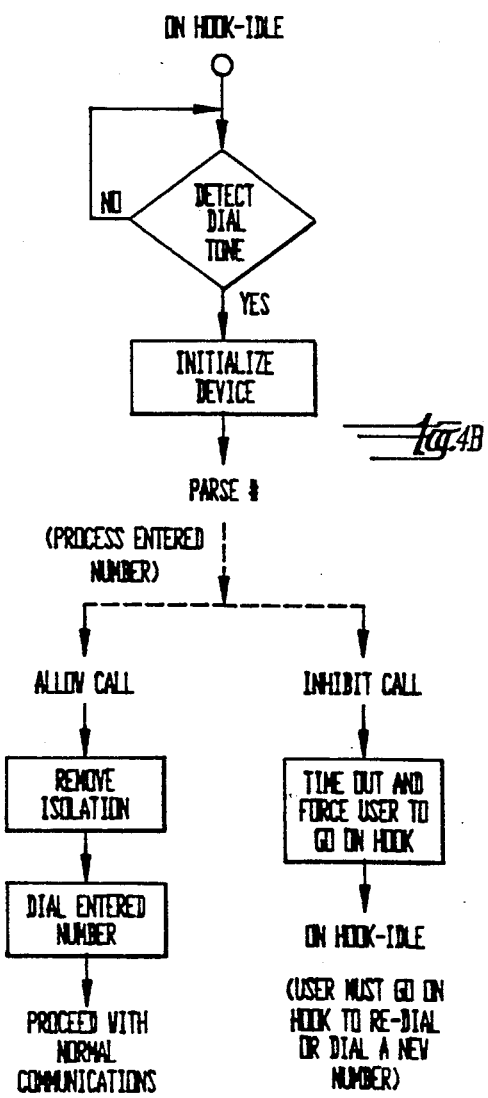

FIG. 2 shows a second embodiment of the invention. This circuit 70 is similar to circuit 10 of FIG. 1 except that the circuit is connected to phone line 32 in parallel, instead of in series as circuit 10 of FIG. 1.

The embodiment of FIG. 2 shows parallel connection means whereby upon detection of the first tones generated by a subscriber after an off-hook condition, a suitable filter 72 or load is placed in parallel to the tip/ring lines 38/36 of the subscriber's phone line 32. Filter 72 provides a means of isolating the subscriber device from the central office by reducing the amplitude of DMTF bursts below the minimum level required by the central office for detection. The tone decoder means 18 provides make-up gain to sufficiently amplify the signal back to a detectable level by tone decoder means 18.

The operation of the parallel circuit 70 is otherwise the same as the serial circuit 10, and provides an additional feature. Only one such device need be installed per subscriber line, without having to break or otherwise disassemble any part of the subscriber telephone station, or line to implement.

Like serial circuit 10, the parallel connection embodiment 70 may be installed in different ways and by different methods.

Circuit 70 could, for example, be mounted in a tamper resistant package which would install in a standard modular connector. Such a package could incorporate a visual indicator if the package was mechanically tampered with.

Another method of installing the circuit would be to install it at the subscriber-to-central-office terminus.

Still another method of installing the circuit would be to install it as an integral part of a standard telephone station.

Yet another method of installing the circuit would be to incorporate it into a standard PBX device.

Another method is to place the circuit or its hardware/computer code analogue in a central office electronic switching system as is typically used by telephone service providers.

Another method is to place the circuit in cellular communications links or any other communications system which uses DTMF means to establish station-to-station path linkages.

Similar electrical and digital signal and data connections are utilized along with bridge 46, Zenor diode combination 50, capacitor 28, transformer 24 and power supply/reset control logic 30.

As with the serial embodiment 10, the parallel embodiment 70 could also be implemented for pulse dial technology. Prior art exists to count pulses, and code the result into a computer detectable result which could then be screened in the same manner as described herein.

FIG. 3 shows a detailed electrical schematic of the parallel circuit 70 of FIG. 2 in one form it could take, including the specific functional components to build such a circuit. As can be seen, microprocessor 12, decoder 18, generator 20, and switches 74 and 76 form the heart of the circuitry and function. FIG. 3 shows the product designation numbers for the elements of the circuitry. Such products are purchasable from any number of electronics and integrated circuit retailers, such as is well known in the art.

The detailed electrical schematic shown in FIG. 3 is only one of several possible implementations. Alternatively, one could employ a commercially available micro-controller embedded in the circuit or a complete custom micro-circuit, neither of which would require a bus structure.

As can further be seen, the enablement of switches 74 and 76 is carried out by relays which are energized according to instructions from microprocessor 12.

Component Functional Descriptions

A detailed description of the major components of FIG. 3 will now be set forth, followed by a general description of operation of the system. Definitions of key terminology regarding the circuitry, its functioning, and the operation of the invention with respect to a specific programming is then included to aid in an understanding of the invention.

SIOO BUS CONN B - The SIOO Bus (shown as data/control bus 44 in FIGS. 1 and 2) is an industry standard 8 bit data and 16 bit address bus with predefined bus control lines. The bus supports many commercially available microprocessor chips such as the Zilog Z80, the Intel 8080, and several others. By definition therefore, the circuit as shown is microprocessor environment independent in that the control functions can be programmed with any compatible processor language supported by the standard. Likewise, as this is an industry standard bus, no discussion is given to industry standard components such as memory or common input/output devices. This implementation is shown only to educate the reader as to the support required to implement the algorithm discussed later which can be used universally to parse and screen DTMF coded numbers in such manner as to allow the processor to either allow or disallow completion of a call.

74LS138(U001), 74LS3-2(U002), 73LS04(U003) (decoder 18 of FIGS. 1 and 2)—these elements, in connected combination, comprise an address decoding means which decode the S100 address bus and control bits to appropriately enable and disable ports 80H, 81H, and 82H in U001, U002, and U003 respectively.

The 74LS125 (U011) is a 4 bit data buffer (tri-state device). Port 80h, when appropriately decoded and enabled, allows data from the DMTF to be transferred to the S100 data bus via data latch U011.

Transfer takes place whenever port 80h is read after an input instruction is executed by microprocessor. Only the low order 4 bits (low nibble) are inputted, all other bits are ignored. Data latched by the DMTF into port 80h remains there until new data is latched into the DMTF register.

LM7805 (U008) is a standard 5 volt, three terminal voltage regulator. This is required in this implementation as the S100 bus supplies as much as +8, +18, and −18 volts unregulated typically. As most standard TTL logic requires +5 volts, the 8 volts is regulated down to 5 volts.

C002 and C003 are filter capacitors usually of a tantalum type and are used to stabilize the input and output of U008, and bypass alternating current components to ground, thus supplying usable direct current voltage to the rest of the circuit.

The SSI20C89(U004) is an industry standard Silicon Systems Inc. dual tone multi frequency input and output device (see DTMF generator 20 of FIGS. 1 and 2). In summary, it is one of several off-the-shelf parts for this function.

In the tone detection mode, it monitors for low level tone signals of the industry standard "DTMF" type. When it has captured a valid tone, it signals such on the DV line, indicating the data on D4, D5, D6, and D7 are valid.

In the tone generation mode, data present on the D4, D5, D6, and D7 lines are considered valid when the "RST" input is enabled along with the "LATCH" input, and standard DTMF tones are generated corresponding to the data present until the "LATCH" and "RST" are disabled. In this implementation, this period is determined by U007.

The sequence for generating a tone is as follows.

The microprocessor 12 writes data to the DMTF (U004) where it is latched indefinitely when "RST" and the "LATCH" input are "low".

The microprocessor outputs a "high" signal on bit 7 of port 82h, causing pin 6 of U007 to go "low". This "low" then enables RL1 via U012 via pin 2, thereby connecting the DTMF tone generator to the line via XFRMR1.

The DTMF chip upon seeing the "LATCH" and "RST" go "low" generates an appropriate tone.

The microprocessor initiates a timer means after outputting to bit 7 of port 82h, and when a sufficient time has passed as determined by programming (a time length that the Central Office or receiving location will need to detect a valid tone), the microprocessor will output a "0" to bit 7 of port 82h. This will remove the DTMF generator from the line, and cause the "LATCH" and "RST" to go to "1", hence ending the DTMF chip's tone generation process.

The microprocessor initiates a timer means after outputting a "1" to bit 7 of 82h, thereby allowing sufficient time for the Central Office or receiving location to set up for the next tone to be received, or for the connection to be established if the tone described was the last tone to be sent.

R001 is a standard resistor, and X1 is a standard television color burst crystal; together they are used to generate clock for the device.

XFRMR1 (see reference numeral 24 in FIGS. 1 and 2) is a standard 600 ohm telephone line isolation transformer (with a termination resistor 25), and the input winding in series with R002 is driven by the DTMF chip when in the tone generation mode. Its output is connected to the telephone line via contacts 3 and 4 of the relay RL1 (see, e.g., switch 76 in FIGS. 2 and 3).

RL1 is a 5 volt relay (switch 74 of FIG. 2) driven by U012, which is in turn driven by the output pin 6 of U007(LS74), which is a latch flip-flop. The transformer is only connected to the line when tones are generated, and is otherwise always disconnected.

RL2 is a 5 volt relay (switch 76 of FIG. 2) driven by U009(7401), which is in turn conditionally enabled by both latches in U007(LS74's). The main function of the relay is to connect the line DTMF filter load, R006 and C005, to a ground path. This relay is only enabled after the microprocessor detects either an off-hook condition, or a valid DTMF condition. On either of these conditions, the filter is enabled, and further tones are prevented from reaching the Central Office.

The gain of the DTMF is sufficiently high in most cases that while the tone cannot be detected at the Central Office, or receiving location, the tone can still be effectively decoded locally. In cases where the Central Office or receiving location is more sensitive, the load filter may be modified accordingly, and a common amplifier may be inserted between C001 and the DIN input of the DTMF chip.

C001 is a DC level blocking capacitor, which prevents unwanted DC voltages from entering the DTMF chip.

LM339(U006) is a comparator which when detecting off-hook conditions, resets U007 latches. When on-hook, the voltage through the voltage divider network R004 and R005 supply greater than 5 volts to the input of the comparator. When the off-hook condition occurs, the input to the comparator drops below its reference input, causing the output to reset the U007 latches. C004 operates to shape this signal to a pulse such that the less-than-5-volt condition only exists for a short duration, usually less than a millisecond (depending on values used). This resetting prevents the circuit from randomly turning on with either the tone generation transformer XFRMRI or the filter load being inadvertently attached to the line and preventing normal operation.

U010, a standard 74125, is a conventional tri-state device which is enabled when a "read" is initiated to port 80h. D4 is read by the microprocessor in order to determine when a valid DTMF tone has been detected by the DTMF chip.

In any of the embodiments described, a typical programming means is utilized and is now described generally. Other programming structures could also be utilized according to desire.

If upon detection of the first tone bursts from the '#' subscriber telephone station, microprocessor decodes a code (from the "#" key on a touch tone phone), it looks for another '#' code to follow. If found, the computer decodes the next two digits as a menu selector, whereby a specific programmable option may be programmed (by touching appropriate touch tone keys on the local phone or a remote phone) according to a described set of rules. If no second code is detected, the number is treated in the above described manner as a normal number invoking special central office functions, and is subject to inhibiting as normal. The choice of two digits and the use of the '#' sign are arbitrary, and are only used here as a typical means of establishing programming.

A typical set of programming options would be:

Where xxx. . . xxxx indicates any combination of digits consisting of the standard DTMF codes 0,1,2,3,4,5,6,7,8,9,10,#,*, of any length, and in particular, an imbedded '*' represents a template mode where any digit the microprocessor attempts to match to a '*' is considered a valid match to that digit;

Where nnn indicates any combination of 3 digits consisting of the standard DTMF codes 0,1,2,3,4,5,6,7,8,9,10,*.

Where yyyy is a four digit decimal number indicating a 24 hour clock hours and minutes.

Where zzzzzz is calendar date in decimal month-/date/year.

Where bbb indicates type of access enabled for the access code following.

Where ccc is a 3 digit decimal number indicating the personal user number assigned to an individual.

Where ddd is a 3 digit decimal number indicating the personal access code itself.

| | |
|---|---|
| ##00 nnn ccc bbb | program personal access code(s) |
| ##01 nnn xxx . . . xxx# | program fixed number to list |
| ##11 nnn xxx . . . xxx# | remove fixed number from list |
| ##02 nnn xxx . . . xxx# | program group number to list |
| ##22 nnn xxx . . . xxx# | remove group number from list |
| ##03 nnn yyyy | program current time |
| ##04 nnn zzzzzz | program current date |
| ##05 nnn yyyy | program inhibit time begin |
| ##06 nnn yyyy | program inhibit time end |
| ##07 nnn zzzzzz | program inhibit date begin |
| ##08 nnn zzzzzz | program inhibit date end |

Where a '#' is used to terminate numbers of indeterminate length.

Samples of typical number parsing results are as follows:

| Inhibit Program Options | Dialed Number | Call Results |
|---|---|---|
| A. Fixed Phone Numbers | | |
| 1. 1 976 555 5555 | 1 976 555 5555 | Inhibited |
| (inhibits one number) | 1 976 655 5555 | Allowed |
| 2. 455 3333 | 455 3333 | Inhibited |
| (inhibits one number) | 1 455 3333 | Allowed |
| | 455 3332 | Allowed |
| | 1 976 455 3333 | Allowed |
| B. Fixed Phone Number Groupings | | |
| 1. 1 976 *** **** | 1 976 555 5555 | Inhibited |
| (inhibits all numbers with 976 area code) | 1 900 555 5555 | Allowed |
| | 1 555 5555 | Allowed |
| 2. 1 *** **** | 1 976 555 5555 | Inhibited |
| (inhibits all long distance calls) | 1 800 555 5555 | Inhibited |
| | 1 555 5555 | Inhibited |
| | 555 5555 | Allowed |
| C. Partial Number Sequences | | |
| 1. 976 | 455 5976 | Inhibited |
| | 1 976 455 5555 | Inhibited |
| | 1 977 5555 | Allowed |
| 2. 9*6 | 1 976 455 5555 | Inhibited |
| | 1 876 455 5555 | Inhibited |
| | 1 975 455 5555 | Allowed |
| | 1 966 5555 | Inhibited |
| | 965 5555 | Allowed |

NOTE: "*" means any number dialed

DESCRIPTION OF OPERATION

General Discussion

The screening and inhibiting process begins whenever an off-hook or a first tone is detected, as appropriate for the implementation. Upon detection of either of these conditions, the microprocessor immediately energizes RL2, effectively preventing tones from being detected by the Central Office or receiving location.

There are different methods which may be optionally implemented in this step. In one implementation, if off-hook is detected, then the line may be isolated immediately, isolating all further tones with no further considerations other than the screening algorithm.

In another implementation, if the first tone is used to initiate the algorithm, then the microprocessor of choice may or may not have sufficient time to respond to the valid tone output "DV" to isolate and prevent the Receiving station from detecting the tone as valid. One option to this inconsistency is to allow the first tone to go through, blocking all others immediately on the end of the first tone, and parse it as any other tone. In one configuration, if it is valid by the parsing rules, it is allowed it to go through; if not, it holds the filter on-line for a predefined length of time as described elsewhere in the parsing process. One consideration when doing this is that in normal telephone systems, the digit "0" is the only valid one tone phone number. If this tone is allowed to go out, connection will be made, and a communication link established. Therefore, in nonstandard or non-telephonic implementations of this scheme, it must be a programmable feature to allow some prederscribed single digits to be automatically allowed, or the filter must be left on, thereby obscuring normal communications, if that digit is determined to be one which it is desirable to inhibit.

In still another implementation, separate control lines may indicate by digital means that a "ready" condition exists on a communications link; that the receiving party is ready to receive DTMF tones.

Other implementations exist in which communications links are established by decoding information embedded in the packet of information being transmitted, and that information is directed to its destination or repeated to a location according to an address contained in that message or packet. This type of communication may or may not use DTMF encoding, and may be of the type of packet communications and local area network communications systems available commercially today, which use wire, coaxial cables, fiber optic communications, radio, or light (visible and non-visible waves). While the communications means may vary, the algorithm remains essentially the same.

The rest of this discussion will deal with the standard telephone type communication as it is foreseen as the most common implementation in the near future. This implementation assumes that off-hook is always a detectable condition, as well as onhook.

Screening and Inhibiting Parsing Algorithm

Reference is now taken to FIGS. 4A-E, which present a preferred embodiment of a specific algorithm useful with the invention. This is set forth with selected reference to the circuitry of FIG. 3. Initially, the processor sits idle. It may be in a powered-down state, or a low current standby state, or it may be in time and date tracking functions, depending on the implementation or the options specified.

DEFINITIONS

Some definitions will assist in an understanding of the algorithm and how it relates to the circuitry and operation of the invention.

User—as defined in the context of this implementation, the user is any person or machine which is connecting to a telephone line which is being monitored by this implementation, generating off-hook conditions, and generating a series of one or more standard DTMF tones in an attempt to establish communications of any nature with a Central Office or receiving location.

Tone—as used in the context of the invention always refers to the DTMF industry standard dual tone multi-frequency set of tones. Hence any reference to tone refers actually to a two-tone combination conforming to DTMF standards.

Non-volatile memory—is defined in the context of this implementation as any memory means which allows the number to be stored for the duration of a transaction, and allows programmed features such as the fixed list and the relative list, etc. to be maintained from one transaction to the next.

Transaction—a transaction is considered as all activity the user, the Central Office or receiving party, and the algorithm.

Stored item—a stored item is an item located in non-volatile memory.

List—a sequential array of items in either fixed length or random length form, with or without delimiters.

Item—a multi-digit string of numbers, with or without delimiters, corresponding to possible tone decode digits or wild card numbers.

Delimiter—a special code digit optionally placed at the beginning or end of a stored item. The delimiter may be detected by the program as a beginning or ending of a valid item.

Wild card digit—a special character which is not associated with an actual valid dialable digit, and is given special meaning when contained within a fixed or relative list. The wild card tells the program that whenever the wild card digit is compared to a digit being dialed, then any digit dialed is considered a match to the wild card digit. Hence, the program will see the wild card digit as any value of 0,1,2,3,4,5,6,7, 8,9,10, or *. Therefore, if "#" is a wild card digit in a relative list, and the relative list consists of an item 2#4, then any occurrence of 204, 214, 224, 234, 244, . . . and 2*4 dialed by a user will be considered to be a match to this relative item. The same applies to the fixed list. By definition here, any fixed list or relative list item may contain wild card digits. In this context, whenever the word "digit" (defined below) appears referencing lists, it is assumed that the digit can be 0,1,2,3,4,5,6,7,8,8,0,10,* individually or inclusively of all of them, and that the microprocessor looks at the list to determine the appropriate meaning.

Digit—a binary coded equivalent to a numbered telephone key being pushed either by a user pushing a button, or a machine generated number activating a DTMF means. A digit in the context of this implementation has a hex value of 0,1,2,3,4,5,6,7,7,8, a,b. The hex values a and b correspond to normal telephone buttons # and * respectively. By definition of this implementation, a digit is that code which is detected by the microprocessor when the DV line of U004 indicates a valid tone is present regardless of the means used to generate it.

Series of Digits—After a digit is detected, the next digit in a series of digits is the one detected when the DV goes invalid for the current valid digit detected, then goes valid again for the next valid tone detected. When this next valid DV is detected by the microprocessor, the tone present then is decoded, and is considered the next digit. This process proceeds until the microprocessor detects a valid termination sequence, or a valid termination pause.

Termination sequence—Regardless of the means of generation, digits are considered by the program in the order they are received, either by receipt and detection of a predefined series of digits the user has previously defined as a termination sequence, or by a pause after the last digit of a length determined by the user which denotes to the microprocessor that the last digit received is the last in a series of digits, and that the series of digits thus received represents a valid number dialed.

In this implementation, the valid number dialed is delimited by the # because it provides an additional means of security in that persons unfamiliar with the user's phone may not use it at all. As the termination sequence is programmable by the user, this option is entirely determined by the user. For purposes of this discussion, we will assume that the #, when used in reference to the number dialed, refers to any termination sequence inclusive of no digit to any reasonable series of digits the user may have programmed into the algorithm. It is left to the user to determine a reasonable digit or series of digits.

Number dialed—a single digit or series of digits sequentially generated by a user when dialing a typical phone number or access number, inclusive of the first digit dialed and all digits if any, until a termination sequence is received. In the context of this implementation, the use of the term will mean that a number has been dialed inclusive any termination sequence or termination pause, and that the algorithm has made the determination that no more digits will be allowed to be detected, and that the microprocessor has retained the whole number dialed in non-volatile memory in such a manner that it can upon determination of necessity, regenerate these digits in their original order and generate DTMF tones in proper sequence, and in a standard manner sufficient to cause the Central Office or receiving station to properly decode the number and establish communications in a normal manner.

Fixed length form—a list of items which have a predescribed number of digits or storage locations per item. Such lists are typically indexed in fixed increments by the program and hence, delimiters are optionally needed to identify the beginning of items, and may be needed to detect ends of items if items are not always exactly as long as the allocated length. Additionally, look-up tables which contain the beginning and/or end or either address of each item may be used. Additionally, bias tables which contain the number of locations from the first location to the item of interest, and the bias to the end of that item may be used.

Random length form—a list of items which have a random or non-fixed number of digits or storage locations per item. Such lists typically use either delimiters or look-up tables or bias tables to reference a particular item.

Fixed list—A fixed number list is one or more complete phone numbers which will be compared to the number dialed, and if any item in the list matches the number dialed exactly, then the number dialed will be inhibited.

Fixed grouping list—A fixed number grouping list is one or more delimited phone number groupings which will be compared to the number dialed.

Relative list—A relative number sequence list is one or more partial phone numbers which will be compared to any portion of a number dialed. If the sequential series of digits defining the item in the list is found to match any series of digits of the same length and of the same sequential order anywhere within the series of digits defining the number dialed, then the number dialed will be inhibited.

Special programming list—A special programming list is one or more numbers of any length which activate special phone features or which define entry access codes for the algorithm to program special functions. These items consist of series of digits which when compared to the first digits received from a user would indicate to the algorithm that the digits dialed by the user after these digits would be stored either in the fixed list, the relative list, the termination list, or that a special function was to be programmed or initialized. Special functions are typically time, date, year, time slot allocation, date allocation, individual access codes, auto-dial or quick dial features.

These special functions allow screening during only certain times, or only certain times on certain days, and can be repetitive, or one time only. Algorithms which allow general functions to act on times and dates are widespread and public domain in nature, and are not described in detail here. Autodialing or quick dialing features are also known in the art and also not described here for that reason. They are mentioned here only to indicate that the algorithm as described here can be easily integrated into current art designs and thus add the new and innovative feature of universal call screening.

Current item—the current item is the sequence of digits currently being stored in non-volatile memory consisting of all valid digits having been received from the user to a particular point in time being discussed.

Off-hook—a standard telephone industry term to denote when the Central office or receiving station detects that a user has engaged a subscriber line or communications means such as to try to establish a communications link.

On-hook—a standard telephone industry term to denote when the Central Office or receiving station detects that a user has disengaged a subscriber line or communications means such as to terminate any communications, or to abort an attempt to establish a communications link.

Dial tone—a standard tone signal supplied to a user by a Central Office or receiving station to indicate that it is ready to accept information in the form of DTMF codes or dial pulses for the purpose of establishing a communications link.

Algorithm Description (refer also to FIGS. 3 and 4A-E)

1. When a user goes off hook, there are two conditions which can be used to determine that in fact this has happened. The Tip to Ring voltage drops from about 50 volts to about 5 volts, and a dial tone is received from the Central Office. Either of these may be detected and used to initiate the parsing process. In this particular implementation, the off-hook voltage is monitored via comparator U006 and the pulse generated is used to reset the system such that the program begins from a predetermined memory location, and executes initialization code. This code includes automatically inhibiting tones from reaching the Central Office by placing a filter across the Tip and Ring.

2. The user proceeds to dial a number as normal.

3. Upon detection of a tone, the algorithm stores the digit in either memory or a register.

4. The algorithm maintains four lists in non-volatile memory, a fixed list and a relative list, a single item termination sequence list, and a special programming list. Upon storage of the digit, the algorithm proceeds to check the current item against the termination sequence to determine if the termination sequence is contained in the current item (being in for form of a sequence of actual digits or a detected time interval with no further tones being detected as defined previously). Note: On the first digit only, the algorithm checks to see if the digit is a value of 0,1,2,3,4,5,6,7,8, or 9. If it is not, and if it is # or * then the algorithm detects and stores this information and continues in a normal manner as described herein. If a second # or * is detected, the algorithm switches to a programming mode in which the tones which follow will be decoded as appropriate for the feature being programmed. If the second digit does not contain # or * then the number being dialed may be a valid communication function for special features supplied by the Central Office or receiving station, and would be subject to screening like any other number dialed.

5. If the result of the previous step was detection of the termination sequence, the algorithm scans the fixed list to see if the number dialed matches any item in the fixed number list. If a match is found to any fixed list item, the algorithm automatically proceeds to a time-out procedure and ignores all further user activity except another on-hook then off-hook sequence. This effectively inhibits the establishment of a communications link. If no match is found, the algorithm removes the filter from the line, and dials the dialed number. The algorithm then ignores all further user activity except another on-hook then off-hook, which would indicate that a new communications link was to be established.

6. If no termination sequence was detected in step 4 then the algorithm next scans the current item, noting whether or not it contains any items from the relative list. If a match is found between any relative list items and the current item, the algorithm automatically proceeds to a time-out procedure and ignores all further user activity except another on-hook then off-hook sequence. This effectively inhibits the establishment of a communications link.

Programming

The discussion thus far has dealt with the algorithm flow as shown in FIGS. 4A–4E. The actual code for any implementation may be generated using any multiplicity of available processor assembly languages or high level languages such as C, BASIC or PASCAL. There are several vendors for such languages such as MICROSOFT, BORLAND, and at least 6 more for each language mentioned.

As there are a multiplicity of ways to code computers to make decisions based on the comparison, and to code computers to move data information from one memory location to another, and to code computers to perform mathematical functions, there will be no attempt made to describe them here. The preferred method of implementing the software coding with the invention is by embedded processor application and design. Software coding and hardware component selection and interfacing can be selected as desired. There are literally thousands of possible processor/hardware/software language combinations which could be used to implement this algorithm, as is known to those skilled in the art.

In the preferred implementation illustrated, the processor was a Zilog Z80 microprocessor, and the language used to code the prototype was Z80 assembly language.

Following is a partial listing of the assembly language code used to assist in an understanding of the invention. As is appreciated, the code could take on many configurations. The section listed deals with the parsing of the number being dialed against a relative number stored in memory. Common programming methods can be used to implement the remaining code for the invention.

The routine R_PARSE: loads the BC register of the Z80 with 0, Loads the HL register with RT_PNTR, which points to memory location 1431 hex (1431h). In this implementation, this location was set up as a pointer to indicate which R-TABLE location contained a number for which a current partial match exists from a previous parsing cycle. This RT_PNTR is the address of the first such flag. R_TABLE is a table defined as 20 bytes followed by a carriage return and line feed, each of which represent a simulated programmed in relative number to inhibit. The first table entry was left blank intentionally. The following contain the relative numbers 979, 666, 1, and the rest were also left blank. The length and locations of this example are arbitrary, as a table has been provided called RT_VECT, which points to each possible relative number (in this case 7 addresses). The * after programmed numbers 979, 666, and 1 are delimiters which tell R_PARSE when the relative number has been completely matched against an equivalent number embedded in the number being dialed. The DE register is loaded with R_TABLE+22 decimal (22d). This initialized the DE to hold the address of the first relative programmed number. This value is then stored in memory location TRVECT, which is used to temporarily store which number is being parsed.

RTLP1: identifies a segment of code which actually compares the number which is being dialed with the relative numbers programed into the table. It is annotated, but basically, what it does, is to compare the digit just dialed with the most current position in R_TABLE for which a partial match exists, or the first position in each table if no previous match exists. If it finds a match in a programmed number in its current position, it checks the next digit stored to see if it is a delimiter, indicating a full match and a call abort. If previous matches existed, but none matches on this digit, the position indicator is reset to the beginning of the number for that table position. Thus as any number is dialed, if the relative number if found anywhere within the number being dialed, it will enable the abort sequence R_ABORT:, which stores this information in the A register, and returns to the routine which called R_PARSE: in the first place.

In a similar manner, a routine was implemented to parse fixed numbers. The difference in the fixed number routine from the relative number routine is that the fixed number routine must find an exact digit-for-digit match exclusive of wild card digits, in order to declare a match an an abort.

In both the relative and fixed number routines, a wild card programmed into the table is a special delimiter, typically a # character, which is interpreted to mean any dialable and decodeable digit will be considered a match for parsing purposes.

Thus we are instructed as to how a typical code block may be implemented. Similarly, al the other code blocks may be implemented, using ordinary software engineering skills.

Thus we can also see that a very simple modification to this code would allow variable length table locations, and that the delimiters or means of distinguishing beginnings and ends are arbitrary and may be programmed to suit the application.

Also, it can be appreciated that several such blocks of code may be linked together with CALLS such that all the functions described elsewhere may be implemented as a functional system.

The actual process of generating such code involves writing assembly language files to implement the blocks in the flow diagram, each block of which would typically be identified as a module. After completion of each module, it is processed by a compiler, which converts the assembly language coding to actual machine readable code. When all modules are compiled, a program called a linker is used to bring all the compiled modules together as a functional command file. Once this file is available, the contents are transferred to an appropriate memory for the implementation, such as EEPROM, EPROM, NOVRAM, PROM, or masked ROM. The memory programmed is then electrically attached to the implementation processor to form a functional implementation.

It will be appreciated that the present invention can take many forms and embodiments. The true essence and spirit of this invention are defined in the appended claims and it is not intended that the embodiment of the invention presented herein should limit the scope thereof.

For example, the invention would allow for access only when a preceding access mode is entered. The invention could also allow access only at certain times and on certain dates. It could also include a means to override the restriction circuit so that the phone could be used in a conventional unrestricted way.

The embodiments described above are minimum technology embodiments in that there is no feedback to the programmer/user to verify specific programming 100%.

Another embodiment could incorporate into the circuit a means of receiving input from a dialed number, and dump the contents back to that connected line. The principle involved here is that a computer with a modem is at the other end of the line with sufficient means of sending programming DTMF tones over the telephone line. Sufficient prior art exists to implement this feature with microprocessor programming changes only.

Another possible embodiment could incorporate the described circuit into existing modems which are commonly connected to voice telephone lines to allow computer data transmission. In this embodiment, the computer/modem combination would act as the call inhibiting device in the manner described above, with the computer acting as a stand alone microprocessor, or as part of a time sharing multi-tasking environment. Again, this method uses prior art to incorporate the innovative claims described herein.

A large number of microprocessors and languages and support software are available which make the microprocessor coding existing art, and hence no description is made of it here. The embodiments described above were implements with a ZILOG Z 80 microprocessor.

It should be further be understood that the present invention is applicable to a number of different hardware configurations and combinations. For example, not only can the system be used in standard voice communication telephone systems, it can be used in virtually any tone; pulse, voice, and/or data communication application. A few examples of other applications would be mobile radio, ship-to-shore telephone, computer-to-computer communication via modem interfaces, cellular telephone, voice and/or data communication by microwave or fiber-optic lines, or facsimile (telecopier) communications.

As previously mentioned, the invention also is applicable not only to DTMF tone communication systems, but to any tone or pulse system utilizing some type of dialing to engage connection with a remote source.

Various options, alternatives, and features can be incorporated into the method of operation of the invention. A prime example would be as follows: instead of utilizing the invention to restrict calls or communication to numbers not found on any restrictive list, the invention would instead operate to only allow calls to be made to numbers on a list or lists. The changes to the invention to accomplish the same are straight forward. It would essentially operate the same except it would restrict all calls except those found on the list. This could be beneficial to certain businesses or applications. In this mode, the invention would parse the outgoing dialed numbers to see if they match any complete or partial number, as previously described on a fixed or group list. It would only allow the outgoing call to be connected to the receiving office if the number of partial number was found on the list or lists. This, in a sense, would be a way to more comprehensively restrict calls from a certain phone or device to as many or as few numbers or types of numbers as would be put on the list or lists.

It is also to be understood that the invention can be selectively installed in any desired phone jack easily and quickly. It does not effect any other extension on that line, which is an advantageous feature of the invention.

What is claimed is:

1. An apparatus for restricting selected, pre-determined outgoing communications of voice or data over a communication line comprising:
   means for monitoring outgoing dialing signals representing one or more sequences of one or more code characters;
   means for sequentially decoding the dialing signals into the sequences of code characters;
   means for comparing any part of each entire sequence of code characters of the decoded dialing signals with a predetermined list of at least one pre-determined sequence of code characters; and
   means for determining if outgoing communication over the communications line will be allowed depending on if the means for comparing matches any part of a decoded sequence of code characters with any pre-determined sequence of code characters on the pre-determined list.

2. The apparatus of claim 1 wherein the means for determining includes at least one of the following, means to disable communication over the communications link and means to allow communications over the communications link.

3. The apparatus of claim 1 wherein the pre-determined list includes sequences of code character variables and combined sequences of code characters and code character variables.

4. The apparatus of claim 3 wherein outgoing communication is disabled if the means for comparing matches any part of a decoded sequence of code characters with any sequence o r combined sequence of code characters and code character variables on the predetermined list.

5. The apparatus of claim 3 wherein outgoing communication is allowed if the means for comparing matches any part of a decoded sequence of code characters and code character variable son the predetermined list.

6. The apparatus of claim 1 wherein the apparatus connects to a telephone means.

7. The apparatus of claim 1 wherein the outgoing dialing signals are tone signals.

8. The apparatus of claim 1 wherein the outgoing dialing signals are pulse signals.

9. The apparatus of claim 7 wherein the means for decoding includes at least one f a DTMF decoder and a pulse decoder.

10. The apparatus of claim 1 wherein the code characters are any combination of one or more numerical digits, function symbols, and combination of numerical digits and function symbols.

11. The apparatus of claim 1 wherein the means for comparing includes a microprocessor means, at least one memory means, and software means.

12. The apparatus of claim wherein the means for monitoring includes connection means for connection of the means in series between the subscriber side and line side of a telephone line.

13. The apparatus of claim 12 wherein the means for determining comprises a switch means connected to the telephone line, the switch means being controllable by the means for comparing.

14. The apparatus of claim 1 wherein the means for monitoring includes connection means for connection of the means in parallel between the subscriber side and line side of a telephone line.

15. The apparatus of claim 14 wherein the means for determining comprises voltage reduction means operatively connected between the subscriber side and line side of the telephone line, the voltage reduction means being controlled by the means for comparing.

16. The apparatus of claim 1 further comprising a means for storing the dialing signals.

17. The apparatus of claim 1 further comprising a means for parsing the decoded dialing signals.

18. The apparatus of claim 1 further comprising a means for regenerating the decoded dialing signals.

19. The apparatus of claim 1 further comprising a power supply means.

20. The apparatus of claim 1 further comprising an access means for overriding the apparatus.

21. A method of restricting selected pre-determined outgoing communications including voice and data communications, to any receiving means comprising:
creating a list of at least one pre-determined sequence of one or more code characters;
monitoring and decoding outgoing telephone dialing signals comprising sequences of code characters;
comparing any part of the sequences of the signals with the list of pre-determined sequences; and
controlling transmission of dialing signals to a receiving means depending upon confirmation of whether or not a match between a sequence and any part of the sequence of code characters of the dialing signals has been made.

22. The method of claim 21 wherein the list of restricted sequences further comprises sequences selected from the set comprising numbers, functions, variables, and combinations of numbers, functions, and variables.

23. The method of claim 21 wherein the comparison by any part of the sequences of the signals is accomplished by comparing code characters one by one for each entire sequence.

24. The method of claim 21 wherein the transmission of dialing signals is disabled upon the monitoring and decoding of the first code character.

25. The method of claim 21 wherein the transmission of a dialing signals is disabled upon the first match of a code character with a restricted code character.

26. The method of claim 21 wherein the step of controlling transmission comprises allowing transmission upon a match between a sequence or any part of a sequence of the dialing signals.

27. The method of claim 21 wherein the step of controlling transmission comprises disabling transmission upon a match between a sequence or any part of a sequence of the dialing signals.

28. A method of automatically restricting any telephone number or combination of digits of a telephone umber, comprising:
storing a list of restricted numbers or partial numbers, the restricted numbers or partial numbers being taken from the set comprising:
sequences of entire telephone numbers,
sequence of partial telephone numbers, and
combined sequences of one or more partial telephone numbers and one or more variables;
detecting dialing of a sequence of numbers;
parsing the sequence of numbers and comparing each sequence to the list of restricted numbers and partial numbers;
preventing output of the dialed number to the line side of a telephone line if any part of the sequence of numbers is identical to a restricted number of partial number.

29. A method of claim 28 wherein the telephone numbers include digits, functions, variables, and combinations of digits, functions, and variables.

30. The method of claim 28 wherein the transmission of the dialed telephone numbers is disabled immediately upon detection of the first digit of the sequence of dialed numbers, the remaining sequence is stored, and the sequence is regenerated after parsing when no match to a restricted number of partial numbers is found.

31. The method of claim 28 further comprising altering the list of restricted numbers.

32. The method of claim 28 further comprising overriding prevention of output of the dialed number by entering a pass code.

33. The method of claim 28 further comprising enabling the method of call restriction for certain times and dates.

34. The method of claim 28 wherein the restricted numbers are prevented with regard to a modem.

35. The method of claim 28 wherein the list of restricted numbers of partial numbers comprises a string of one or more dialing characters X where X equals any character selected from the set 0, 1, 2, 3, 4, 5, 6, 7, 8, 9, #, *, and the number of characters can vary from one to a string of a plurality of characters.

36. Circuit mans for restricting selected, pre-determined outgoing telephone calls comprising:
- connection means for connecting the circuit between the subscriber side and line side of the telephone line;
- decoder means for decoding any outgoing telephone dialing signals comprising a sequence of one or more telephone dialing signals;
- control means for storing any decoded dialing signals and comparing those signals to a list or lists of restricted telephone characters, the restricted telephone characters each comprising one or more symbols corresponding to telephone dialing keys;
- regenerator means for regenerating stored dialing signals in the control means;
- power means for providing electrical power to the circuit;
- transformer means for regulating voltage to the circuit;
- switching means operating in response to the control means for disabling transmission of dialing signals in the telephone line upon match of a restricted telephone character with a decoded dialing signal;
- bridge means for controlling current in the circuit;
- reset means for enabling the telephone line after disablement; and
- disabling means controlled by the control means for operating the switch means.

37. The circuit means of claim 36 wherein the control means comprises a computer means, a memory means, and software means.

38. The circuit means of claim 36 wherein the disable means includes switch means if the circuit is connected in series with the telephone line, and a voltage regulator means if the circuit means is connected in parallel to the telephone line.

* * * * *